(12) United States Patent
Douglas et al.

(10) Patent No.: US 8,090,220 B2
(45) Date of Patent: Jan. 3, 2012

(54) RESOLUTION ENHANCEMENT OF VIDEO SEQUENCES WITH ARBITRARY ENHANCEMENT FACTOR

(75) Inventors: Dave S. Douglas, Burbank, CA (US); Jingning Pan, Tucson, AZ (US)

(73) Assignee: Raytheon Company, Waltham, MA (US)

(*) Notice: Subject to any disclaimer, the term of this patent is extended or adjusted under 35 U.S.C. 154(b) by 816 days.

(21) Appl. No.: 12/178,353

(22) Filed: Jul. 23, 2008

(65) Prior Publication Data

US 2010/0021084 A1  Jan. 28, 2010

(51) Int. Cl.
*G06K 9/32* (2006.01)

(52) U.S. Cl. ........ 382/299; 382/254; 382/276; 382/294; 382/298; 382/300

(58) Field of Classification Search .................. None
See application file for complete search history.

(56) References Cited

U.S. PATENT DOCUMENTS

| 7,003,177 | B1 * | 2/2006 | Mendlovic et al. | 382/299 |
| 7,956,870 | B2 * | 6/2011 | Snyder et al. | 345/606 |
| 2005/0232514 | A1 * | 10/2005 | Chen | 382/298 |
| 2009/0079876 | A1 * | 3/2009 | Takeshima et al. | 348/699 |

OTHER PUBLICATIONS

Park et al., "Super-Resolution Image Reconstruction: A Technical Overview", May 2003, IEEE Signal Processing Magazine, vol. 20 Issue:3, pp. 21-36.*

Conchello et al., Subpixel resolution in maximum likelihood image restoration, Institute for Biomedical Computing and Biology Dept., SPIE Code. No. 2984-20, pp. 1-11.
Elad et al., Restoration of a single superresolution image from several blurred, noisy and undersampled measured images, IEEE Transactions on Image Processing, vol. 6, No. 12, Dec. 1997, pp. 1646-1658.
Farsiu et al., Fast and robust multiframe super resolution, IEE Transactions on Image Processing, vol. 13, No. 10, Oct. 2004, pp. 1327-1344.
Nguyen et al. A Computationally efficient superresolution image reconstruction algorithm, IEEE Transactions on Image Processing, vol. 10, No. 4, Apr. 2001, pp. 573-583.
Robinson et al., Statistical performance analysis of superresolution image reconstruction, IEEE 2004, pp. 144-149.
Willet et al., Wavelet-based superresolution in astronomy, Depts of Electrical and Computer Engineering at U of Wisconsin-Madison and Rice University, Mar. 2004, pp. 1-10.

* cited by examiner

*Primary Examiner* — Sath V Perungavoor
*Assistant Examiner* — Jason Heidemann
(74) *Attorney, Agent, or Firm* — Eric A. Gifford

(57) ABSTRACT

Restoration based super-resolution combines a video sequence of low-resolution noisy blurred images using maximum likelihood estimation without regularization to produce a higher resolution image or video sequence up to a maximum enhancement factor r for the given video sequence. The maximum r value for a given sequence of low-resolution images that guarantees each high-resolution bin (pixel) will have at least one assigned pixel value from a low-resolution image is calculated. With the knowledge of max r, the system can select an r less than or equal to max r and thus operate without regularization. System robustness is further enhanced by providing a modified MLE estimator that can perform super resolution for arbitrary real-valued r so that enhancement is not limited to integer values.

22 Claims, 9 Drawing Sheets

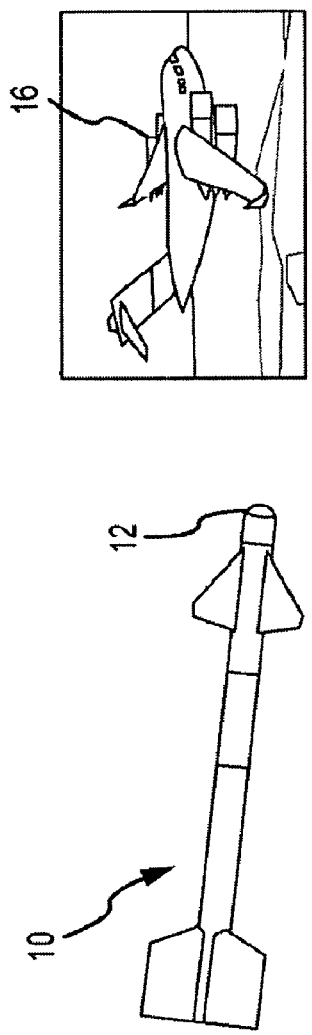
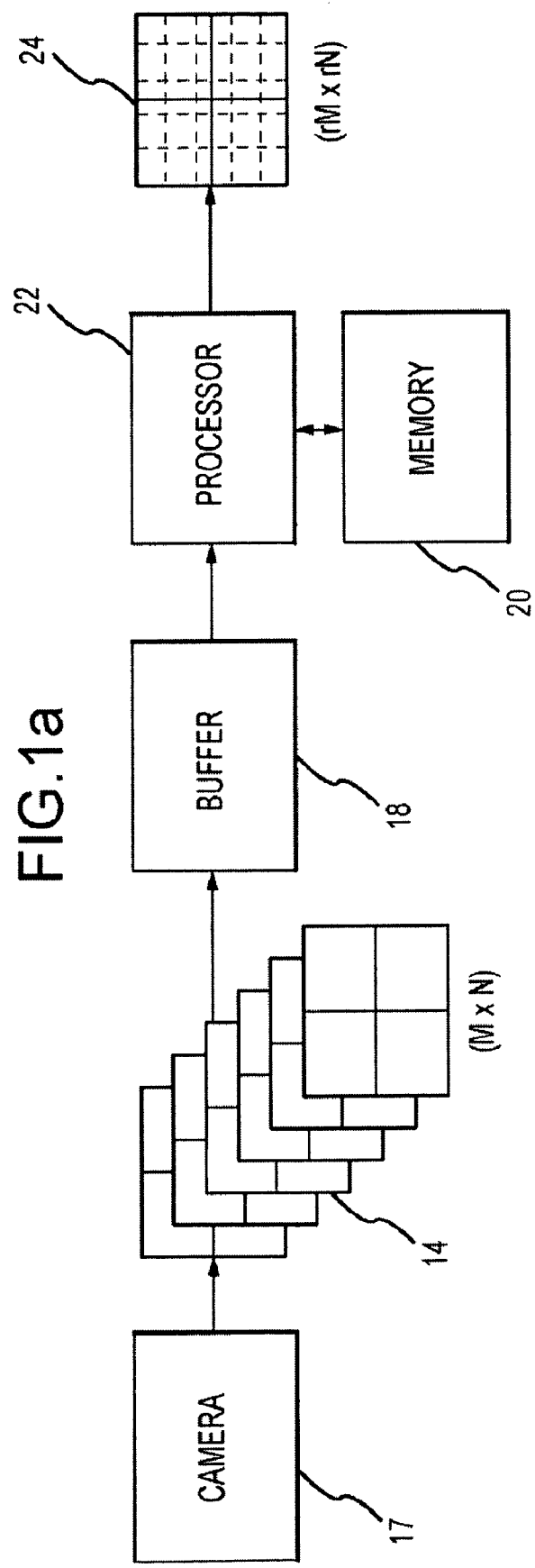
FIG.1a
FIG.1b

RESOLUTION ENHANCEMENT OF VIDEO SEQUENCES WITH ARBITRARY ENHANCEMENT FACTOR

BACKGROUND OF THE INVENTION

1. Field of the Invention

This invention relates to restoration based super-resolution for combining a video sequence of low-resolution noisy blurred images to produce a higher resolution image or video sequence, and more particularly to a technique for resolution enhancement without regularization up to a maximum enhancement factor r for a given video sequence that supports both integer and real-valued r.

2. Description of the Related Art

In defense and other applications camera systems produce a sequence of low-resolution (LR) noisy blurred images. The optical/mechanical/electrical imaging characteristics of the camera itself, in addition to atmospheric and motion blurring, limit the resolution and noise performance of the captured images. Super-resolution combines the low-resolution (LR) noisy blurred images and produces either a higher resolution (HR) image or sequence of HR images. Super-resolution techniques are based on an electro-optical model of the imaging system and rely on temporal motion of the camera from frame-to-frame so that the LR images contain similar but not identical information. Super resolution can significantly increase image resolution without changing optical/mechanical/electrical imaging characteristics of the camera.

A dynamic scene with continuous intensity distribution $X(x, y)$ is seen to be warped at the camera lens because of the relative motion between the scene and camera. The images are blurred both by atmospheric turbulence and the camera lens by continuous point spread functions $H_{atm}(x,y)$ and $H_{cam}(x,y)$, respectively. The images are discretized at the digital video camera resulting in a digitized noisy frame $Y(m,n)$. This forward model is represented by following:

$$Y(m,n)=[H_{cam}(x,y)F(H_{atm}(x,y)X(x,y))]!+V(m,n) \quad (1)$$

where ** is the two-dimensional convolution operator, F is the warping operator, ! is the discretizing operator, $V(m,n)$ is the system noise, and $Y(m,n)$ is the resulting discrete noisy and blurred low-resolution image. Based upon the model, high resolution (HR) image, $X(x,y)$, can be estimated from a sequence of low resolution (LR) noisy images, $Y_k(m,n)$.

The general matrix super-resolution formulation from (1) can be simplified as $$Y_k=D_k H_{k,cam} F H_{k,atm} X + V_k \quad k=1,\ldots,L \quad (2)$$

where the $[r^2M^2 \times r^2M^2]$ matrix $F_k$ is the geometric motion operator between the HR frame X (of size $[r^2M^2 \times 1]$) and the kth LR frame $Y_k$ (of size $[M^2 \times 1]$) and r is the resolution enhancement factor. The camera is modeled by the $[r^2M^2 \times r^2M^2]$ blur matrix $H_{k,cam}$ the atmosphere blur is represented by $[r^2M^2 \times r^2M^2]$ matrix $H_{k,atm}$, and $[M^2 \times r^2M^2]$ matrix $D_k$ represents the decimation operator. The $[M^2 \times 1]$ vector $V_k$ is system noise and L is the number of available LR frames. For a specific camera, $H_{k,cam}$ will be a constant matrix. In many cases, atmosphere noise is relatively smaller than camera blur so $H_{k,atm}$ can be ignored.

Using a Maximum Likelihood approach, a minimization criterion and iterative form of the estimation is presented as follows:

$$X = \underset{\hat{X}}{\text{ArgMin}}\left[\sum_{k=1}^{L} \|D_k H_k F_k X_n - Y_k\|^2\right] \quad (3)$$

Where $H_k=H_{k,cam}$. Since it depends on sensor only, $H=H_k$ $$X_{n+1} = X_n - \lambda\left(\sum_{k=1}^{L} D_k^T H^T F_k^T (D_k H F_k X_n - Y_k)\right) \quad (4)$$

2here $\lambda$ is an iteration factor. Since $D^T D=1$, $F_k^T F_k=1$, and assume $HF_k X_n = F_k H X_n$ (either shifting first or blurring first won't change LR images much)

$$X_{n+1} = X_n - \lambda H^T\left(\sum_{k=1}^{L}(H X_n - D_k^T F_k^T Y_k)\right) \quad (5)$$

The matrix MLE is initialized for $X_0$ using, for example, a Weiner filter and than iterated until $X_{n+1}-X_n$ satisfies a convergence criterion.

This formulation of the MLE for super resolution based image restoration has a few well known deficiencies regarding the selection of the enhancement factor "r" that both prevent its direct application to real imagery in fielded restoration systems and limit its resolution enhancement capability and flexibility.

If the selected "r" value is too big, a significant number of pixels in the restored high-resolution image will have no value assigned to them from one or more of the LR images. This can induce failure of the restoration process ('ringing' in the HR image). Therefore, known super resolution systems employ some form of 'regularization' (spatial smoothing) to ensure the system is robust (ringing does not occur). Sina Farsiu et al. "Fast and Robust Multiframe Super Resolution", IEEE Transactions on Image Processing, Vol. 13, No. 10, October 2004 pp. 1327-1344 addresses the issue of regularization in section "C. Robust Regularization" on p. 1331 stating that super-resolution is an ill-posed problem. For the under-determined cases (i.e., when fewer the $r^2$ frames are available) there exist an infinite number of solutions which satisfy the general super resolution matrix formulation. The solution for square and over-determined cases is not stable, which means small amounts of noise in measurements will result in large perturbations in the final solution. Farsiu states "Therefore, considering regularization in super-resolution algorithms as a means for picking a stable solution is very useful, if not necessary." A regularization term compensates the missing measurement information with some general prior information about the desirable HR solution, and is usually implemented as a penalty factor in the generalized minimization cost function. The regularization is performed whether a particular r is too big or not for a particular sequence of LR images because that determination is unknown. Regardless of the sophistication of a particular regularization approach, regularization inherently removes some high frequency content which tends to blur sharp edges in the imaged scene and create other artifacts.

Another deficiency is that all existing restoration based super-resolution approaches use the matrix formulation of the MLE in equation 5, which is inherently limited to integer-valued enhancement factors. Downsampling matrix D is only valid for integer values of r. Thus these systems are often un-robust.

SUMMARY OF THE INVENTION

The present invention provides for a robust method of restoration based super-resolution for combining a video sequence of low-resolution noisy blurred images using maximum likelihood estimation without regularization to produce a higher resolution image or video sequence up to a maximum enhancement factor r for a given video sequence that supports both integer and real-valued r.

This is accomplished by calculating the maximum r from the measured low-resolution (LR) image motion that guarantees every high-resolution (HR) bin in the HR image will have at least one LR value associated with it for a given video sequence of LR images. The max r will vary with the number of images in the sequence and the image motion for the sequence. The restoration system can either select an r equal to or less than the maximum r for a given video sequence of LR images or can select a sufficient number of LR images to satisfy the optimality criterion for a pre-selected r value, which itself may be either fixed or variable from image-to-image. A maximum likelihood estimator (MLE) is constructed from the measured image motion and selected r without a regularization term. If r is constrained to be an integer, the conventional matrix implementation of the MLE can be used without regularization. If r is allowed to be real, a modified MLE without regularization is required. The MLE is initialized and iterated on the sequence of LR images to convergence to produce the HR resolution image or sequence of images.

The maximum enhancement factor r for a given video sequence of LR images is based on maximum entropy theory. The enhancement factor r is incremented from an initial value of one in fractional step-sizes (e.g. 0.1) until the maximum entropy ($\log r^2$) is greater than the actual entropy of the sequence of LR images. r is decremented and provided as the maximum enhancement factor.

In a typical scenario where the distance between the imaged scene and the sensor is large, image motion is completely characterized by sensor rotation, zooming and translation. The sequence of L LR images is rotated and de-zoomed to a baseline image. r is incremented and an occurrence matrix P(i,j) is initialized to 0 for i,j=0, 1, ... floor(r). The translation $u_k$, $v_k$ of each LR image (k=1 to L) is mapped into the occurrence matrix using the modulus operator where $u_k$, $v_k$ are the dividends and r is the divisor and each mapped bin in the matrix is assigned a value of one. A count n equal to the number of mapped bins or "1s" is computed. The entropy is log(n). The steps are repeated until log(n)<2 log(r) i.e. actual entropy is less than the maximum entropy. r is decremented and provided as the maximum enhancement factor.

The modified maximum likelihood estimator for real-valued r is given by:

$$X_{n+1} = X_n - \lambda H^T \left( \sum_{k=1}^{L} \sum_{q=1}^{L_{q,k}} (HX_n - Y_k(L_{i,k,q}, L_{j,k,q})) \right)$$

where X is the (rM,rN) HR image, Y is the (M,N) LR image, H is the de-convolution kernel for the blurring operation, $(L_{i,k,q}, L_{j,k,q})$ are HR-to-LR mapping indices and $L_{q,k}$ is the count of mapping indices for each HR pixel in each LR image. The modified MLE is constructed by forming the H and $H^T$ deconvolution kernels from a model of the imaging system used to capture the LR images and measuring image motion (e.g. rotation, zoom and translation) for each LR image. From the selected enhancement factor r and measured image motion, an HR-to-LR backward mapping ($R_{l,k}$, $C_{l,k}$) is constructed for each LR image. The HR- to LR mapping indices $(L_{i,k,q}, L_{j,k,q})$ are assigned for each ($R_{l,k}$, $C_{l,k}$) in each LR image using, for example the following criterion: $\sqrt{(L_{i,k,q}-R_{l,k})^2+(L_{j,k,q}-C_{l,k})^2} \leq c$ where k=1, 2, 3, ... L. To mathematically ensure that each real coefficient is assigned at least one LR index in at least one of the LR images, c must be >=SQRT(2)/2 (e.g. a coefficient in the center of an LR bin will map to an LR index). To improve computational efficiency, a smaller value of c (e.g. c=0.5) may be used. The effect on overall system performance of a few unassigned HR pixels is negligible. The number of indices per HR pixel per LR images are counted as $L_{q,k}$. The indices ($L_{i,k,q}$, $L_{j,k,q}$) and count $L_{q,k}$ are stored and used to construct the modified MLE.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 1a and 1b are a diagram of a missile that uses a seeker to engage a target and a simplified seeker block diagram that uses restoration based super-resolution to combine a video sequence of low-resolution noisy blurred images to produce a higher resolution image or video sequence in accordance with the present invention;

DETAILED DESCRIPTION OF THE INVENTION

Figure 2:
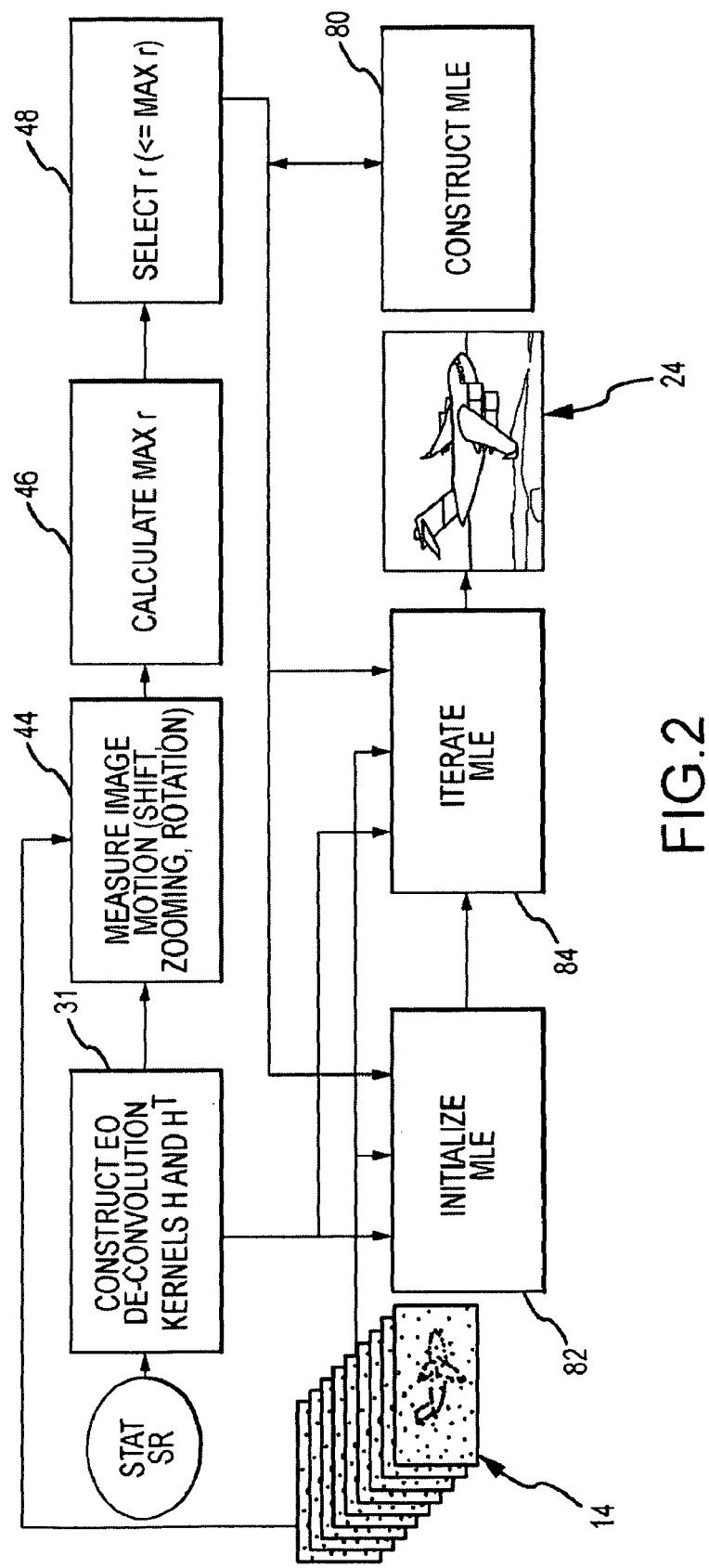
FIG. 2 is a block diagram illustrating the method of super-resolution using a maximum likelihood estimator (MLE) without regularization to produce the higher resolution image(s)

The present invention describes restoration based super-resolution for combining a video sequence of low-resolution noisy blurred images using maximum likelihood estimation without regularization to produce a higher resolution image or video sequence up to a maximum enhancement factor r for a given video sequence that supports both integer and real-valued r. This is accomplished by calculating the maximum r value for a given sequence of low-resolution images that guarantees each high-resolution bin (pixel) will have at least one assigned value from a low-resolution image. With the knowledge of max r, the system can select an r less than or equal to max r and thus operate without regularization. System robustness is further enhanced by providing a modified MLE estimator that can perform super resolution for arbitrary real-valued r so that enhancement is not limited to integer values. This restoration based super-resolution approach can be applied to a wide variety of applications in which a sequence of LR images are available, the imaging system can be modeled and a high resolution image or sequence of images is desired.

Restoration Based Super Resolution without Regularization

A typical scenario for restoration based super-resolution is depicted in FIGS. 1a and 1b in which a missile 10 uses a seeker 12 to capture and process low-resolution video images 14 to engage a target 16 such as an enemy aircraft. The seeker 12 includes a camera 17 that captures the low-resolution video images 14, a buffer 18 that buffers a fixed or variable number of the LR images, a memory 20 and a processor 22 that combines the buffered LR images to generate high-resolution video images 24. The processor calculates the max enhancement factor r, selects an r that satisfies that optimality criterion and applies maximum likelihood estimation without regularization for the selected r. Additional downstream processing on-board the seeker benefits from the enhanced resolution to improve any one or more of detection, identification, tracking and aimpoint selection functions.

As shown in FIG. 2, processor 22 is configured to implement super-resolution using maximum likelihood estimation based on the max r calculation to combine the low-resolution video images 14 into one or more high-resolution video images 24. This approach can be used with the conventional MLE using integer-valued r or with a modified MLE for real-valued r, both without regularization.

Figure 3:
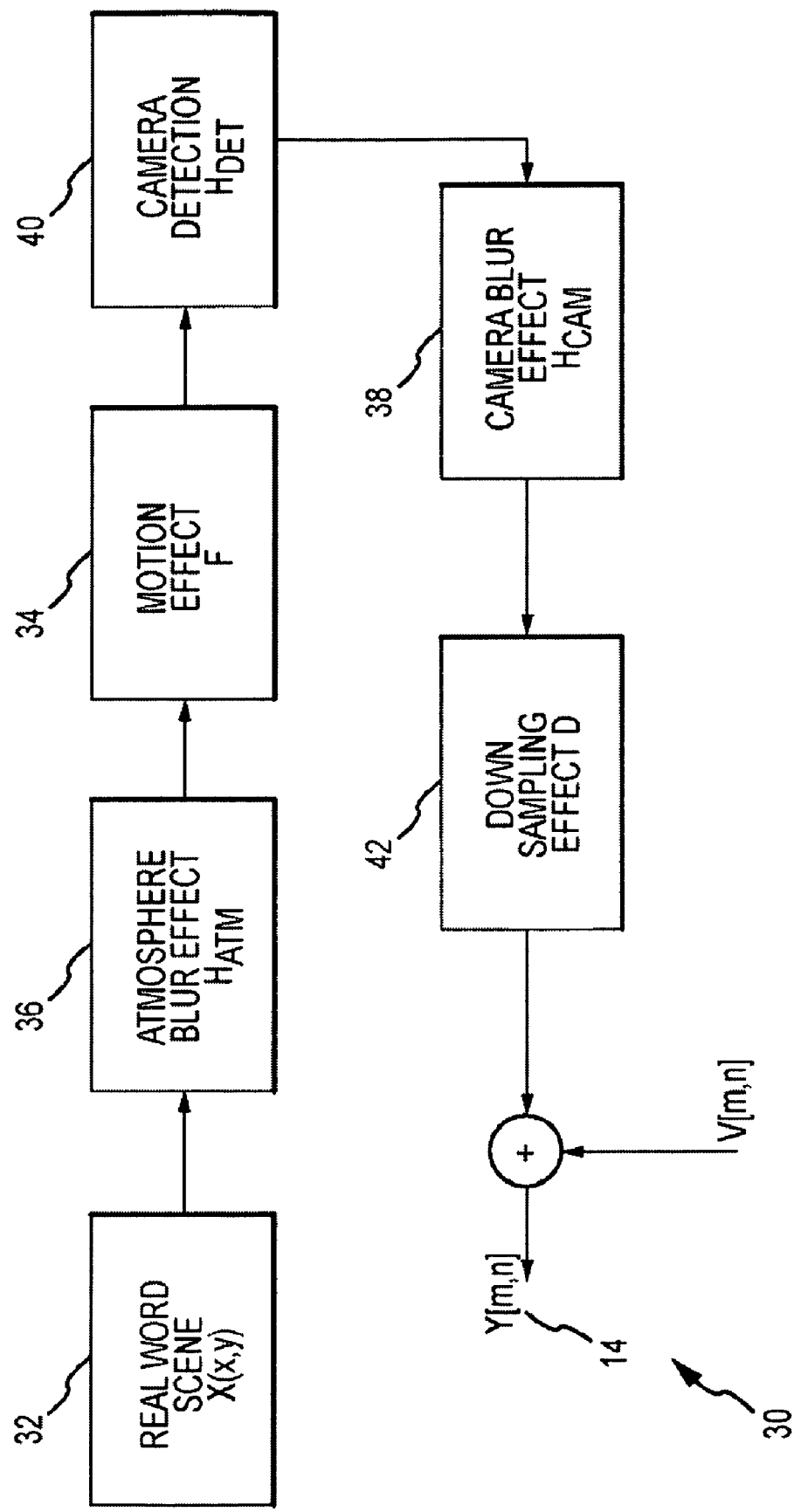
FIG. 3 is a model of the imaging system used to capture the noisy LR images in which the camera model includes camera detection and camera blur effect.

Processor 22 constructs the H and $H^T$ deconvolution kernels from a model 30 (FIG. 3) of the imaging system that captured the LR images of the type depicted in FIG. 2 (step 31). As shown in FIG. 3, in model 30 a real world scene 32 with continuous intensity distribution X(x, y) is seen to be warped at the camera lens because of the relative motion F 34 between the scene and camera. The images are blurred both by atmospheric turbulence and camera lens by continuous point spread functions $H_{atm}(x,y)$ 36, $H_{cam}(x,y)$ 38 and an additional camera detection effect $H_{det}$ 40. Conventionally, a Gaussian lowpass filter is used to model the camera $H_{cam}(x, y)$. Convolving the Gaussian lowpass filter with a rectangular window function $H_{det}$ indicative of the detection effect improves the noise generation model. The images will be discretized (digital sampling effect D 42) at the digital video camera resulting in a digitized noisy frame Y(m,n). This forward model is represented by the following: Y(m,n)= [$H_{cam}(x,y)$$H_{det}$$F(H_{atm}(x,y)$X(x,y))]!+V(m,n) where  is the two-dimensional convolution operator, F is the warping operator, ! is the discretizing operator, V(m,n) is the system noise, and Y(m,n) is the resulting discrete noisy and blurred low-resolution image 14.

Processor 22 measures image motion for each LR image (step 44). The image motion can be measured from the sequence of LR images and/or directly from the motion of the camera itself. The motion effect $F_k( )$ is a transformation. When the distance between the scene and camera is large, the transformation can be approximated by sensor rotation ($roll_k$), zooming ($z_k$), and translation ($u_k$, $v_k$). Here $z_k$ presents zooming of a LR image from baseline LR image. Usually the baseline image is the first image of the image sequence. $z_k$ is different from magnification factor r. r presents magnification of the baseline LR image to achieve a HR image. Since the LR image sequence is typically short, $z_k$ is usually a constant of one.

The processor uses the measured image motion to calculate a maximum enhancement factor r that guarantees each bin (pixel) in a high-resolution (HR) image having resolution equal to max r*M×max r*N will have at least one corresponding LR intensity value (step 46). The maximum enhancement factor r for a given video sequence of LR images is based on maximum entropy theory. The enhancement factor r is incremented from an initial value of one in small step-sizes (e.g. 0.1) until the maximum entropy ($\log r^2$) is greater than the actual entropy of the sequence of LR images. r is decremented and provided as the maximum enhancement factor.

Figure 4C:
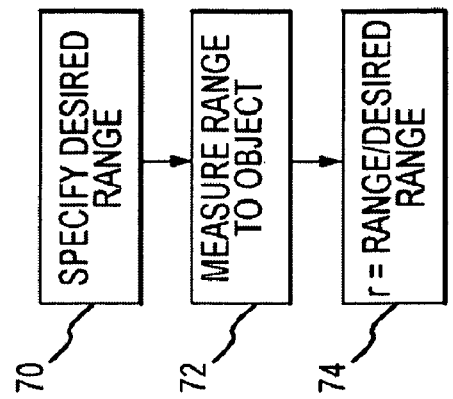
FIGS. 4a-4c are flow diagrams of different super-resolution embodiments using the maximum enhancement factor r.
Figure 4B:
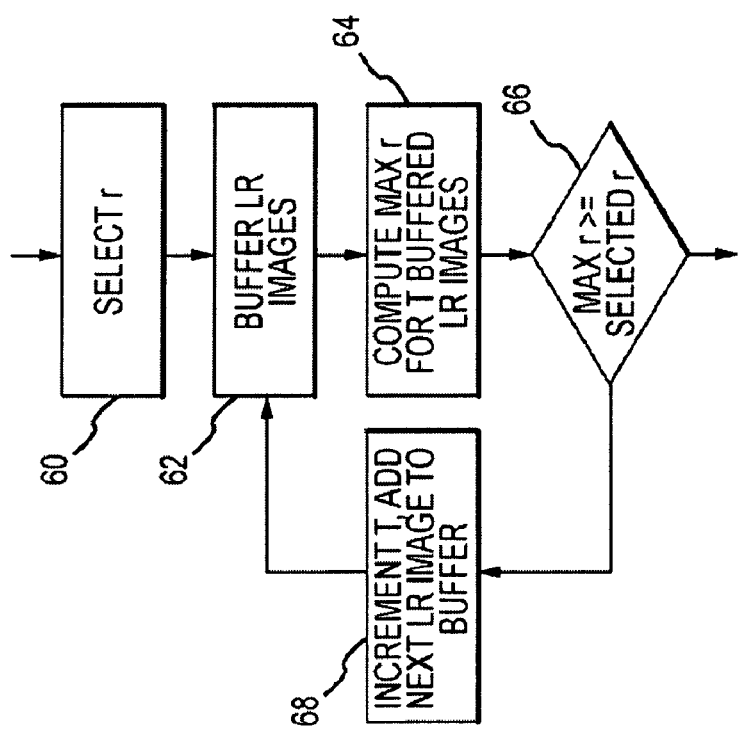
Figure 4A:
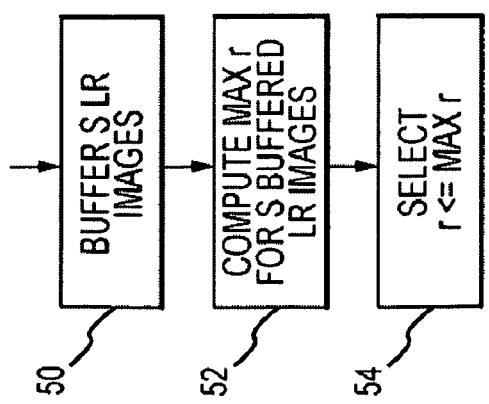
Figure 6:
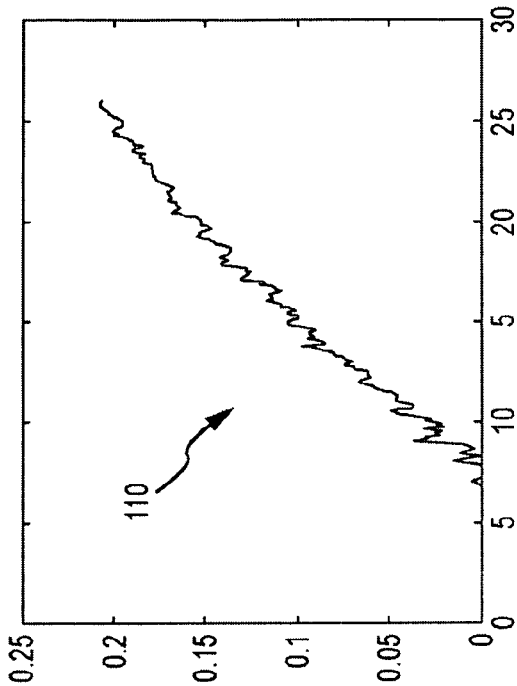
FIG. 6 is a plot of relative error versus enhancement factor r for a sequence of LR images.

The processor selects an enhancement factor r less than or equal to max r (step 48). In general, the max r is real-valued. If the system implements the modified MLE this real-valued max r or another real-valued r less than max r may be used. If the system implements the conventional MLE an integer valued r less than or equal to max r is selected. As illustrated in FIG. 4a, the system may, for example, buffer a fixed number S of LR images at a time (step 50) in which case the processor calculates the max r (step 52) and selects an r value that satisfies the optimality constraint (step 54). Max r may change as different LR images fill the buffer. As shown in FIG. 4b, the system may buffer a variable number T of LR images in which case the process may pre-select a desirable r (step 60), buffer an initial number T of LR images (step 62), and compute max r for the T buffered LR images (step 64). If max r>=the selected r (step 66) the system processes the T LR images. Otherwise, T is incremented and the next LR image is placed in the buffer (step 68) and steps 64 and 66 are repeated until the condition is satisfied. The selected r value may be fixed or may change from frame-to-frame. As illustrated in FIG. 4c, the r value can be selected to provide range enhancement. The goal is to maintain the size of an object or target in the HR image as the size taken from a desired range as the range to target changes. This entails specifying the desired range (step 70), measuring the range to the object at each frame (step 72) and computing r=range/desired range (step 74). Range enhancement is one example of an application that is enabled by the modified MLE which can process real-valued r.

Once r is selected, the LR images buffered and the motion measures, the processor constructs the MLE (step 80). For a conventional MLE, the processor constructs the MLE described in equation (5) above. In particular, the $D_k^T$ and $F_k^T$ matrices are constructed. For a modified MLE, the processor constructs the MLE described below in equation 10 as illustrated in FIGS. 7-10. In particular, the HR-to-LR indices ($L_{i,k,q}$, $L_{j,k,q}$) and count $L_{q,k}$ are constructed and stored in memory. In neither case is a regularization term included in the construction of the MLE. The calculation of max r and selection of r eliminate the need for regularization.

The processor initializes the MLE to provide an initial HR image $X_0$ (step 82). There are a number of different ways to initialize the MLE. One approach is to average the LR images or to select the closest LR pixel for each LR pixel and then apply a Wiener filter to de-blur the effects of PSF and detection.

The processor iteratively applies the MLE to the initial HR image and sequence of LR images until the solution converges to generate an HR image having rM×rN resolution (step 84). The MLE estimates the high resolution from the low resolution to derive an error in the high resolution image. The error correction is accumulated for the high resolution image, de-convolved with the de-blurring kernel and subtracted from the previous estimate of the HR image. This continues until the HR image satisfies a convergence criterion (e.g. mean squared error (MSE) between iterations is less than a threshold).

This approach can be used to generate a single HR image from a sequence of LR images. Alternately, the approach can generate a sequence of HR images from the sequence of LR images e.g. as more LR images are captured the system generates additional HR images.

Maximum Enhancement Factor r

The maximum enhancement factor r is the maximum r for a given sequence of LR images for which each HR bin (pixel) is guaranteed to have at least one LR value (pixel value) in at least one LR image assigned. The calculation of the maximum enhancement factor r for a given video sequence of LR images is based on maximum entropy theory. The enhancement factor r is incremented from an initial value of typically one in fractional step-sizes less than one (e.g. 0.1) until the maximum entropy ($\log r^2$) is greater than the actual entropy of the sequence of LR images. r is decremented and provided as the maximum enhancement factor. The accuracy of max r is determined by the selection of step-size. If r is constrained to integer values in the MLE equation, one can either use the real-valued max r and round down to the closest integer or set the step-size equal to one.

For generalized image motion, r is set to an initial value and incremented by the step-size. An occurrence matrix P(i,j) is initialized to 0 for i,j=0, 1, . . . floor(r). Each LR image is mapped to a pair of indices Hr(k), Hc(k) in the occurrence matrix P(i,j) based on the measured image motion and r and each mapped bin is assigned a constant value, typically one. A count n equal to the number of mapped bins is computed. If the actual entropy given by log(n) is not less than the maximum entropy given by 2 log(r), r is incremented and the steps are repeated until the condition is met. r is then decremented and provided as the maximum enhancement factor.

Figure 5:
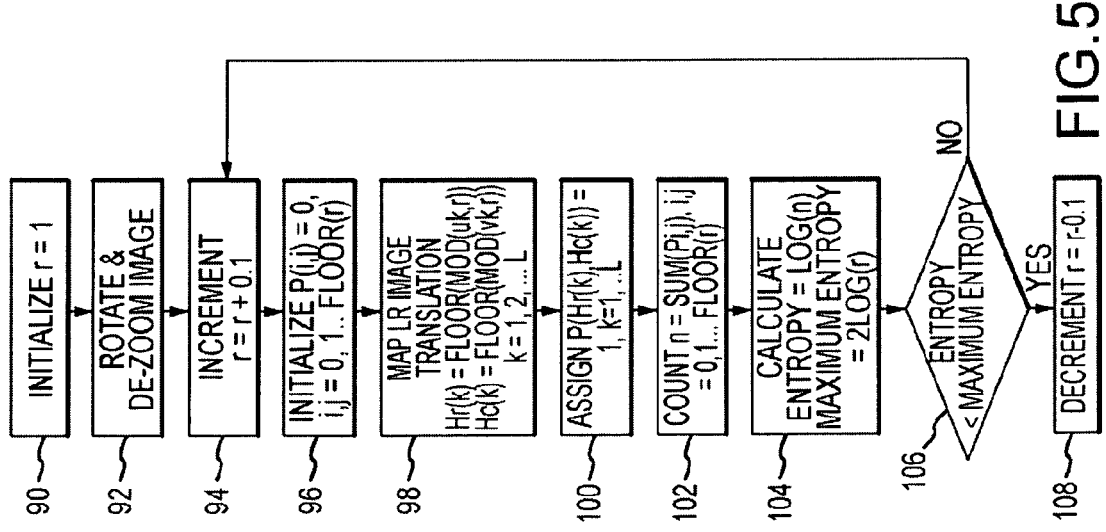
FIG. 5 is a flow diagram for calculating the maximum enhancement factor r for a given video sequence of LR images based on maximum entropy theory.

In a typical scenario where the distance between the imaged scene and the sensor is large, image motion is completely characterized by sensor rotation, zooming and translation. As illustrated in FIG. 5, r is suitably initialized to a value of one (step 90) and the sequence of L LR images is rotated and de-zoomed (system zoom) to a baseline image (step 92). r is incremented (step 94) and an occurrence matrix P(i,j) is initialized to 0 for i,j=0, 1, . . . floor(r) (step 96). The translation $u_k$, $v_k$ of each LR image (k=1 to L) is mapped into the occurrence matrix using the modulus operator where $u_k$, $v_k$ are the dividends and r is the divisor (step 98) (Hr(k)=floor(mod(uk,r)) Hc(k)=floor(mod(vk,r))) and each mapped bin in the matrix is assigned a value of one (step 100). A count n equal to the number of mapped bins or "1s" is computed (step 102). The actual entropy and maximum entropy are computed as log(n) and 2 log(r), respectively (step 104). The steps are repeated until log(n)<2 log(r) i.e. actual entropy is less than the maximum entropy (step 106). r is decremented and provided as the maximum enhancement factor (step 108).

A plot 110 of relative error, which is defined as the maximum entropy minus actual entropy divided by the maximum entropy, versus r for a given sequence of LR images. The max r is 6.7 in this example.

Maximum Likelihood Estimator (MLE) for Real-Valued r

Figure 7:
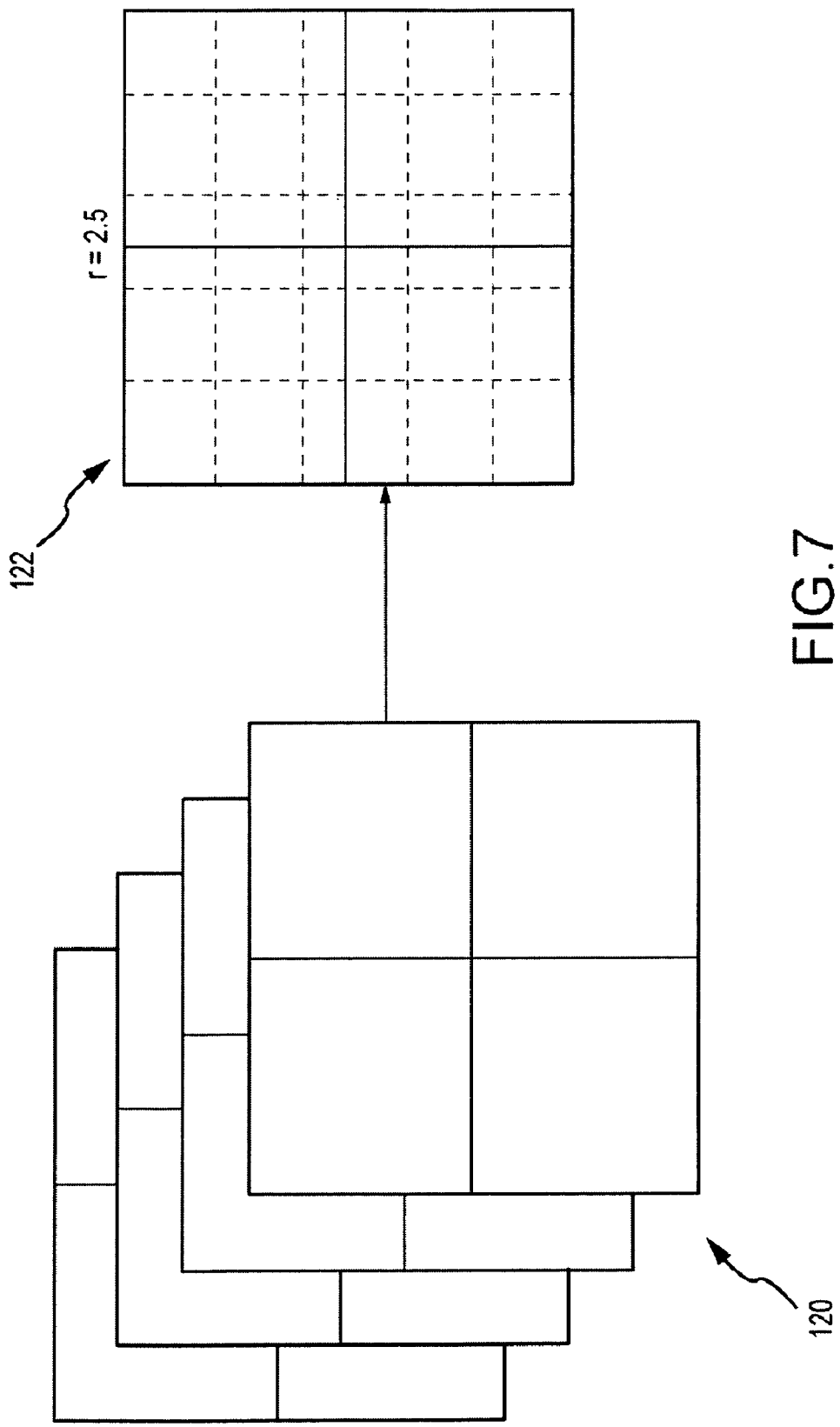
FIG. 7 is a diagram illustrating the combination of a sequence of low-resolution images to produce a high-resolution image with an arbitrary real-valued enhancement factor r.
Figure 8:
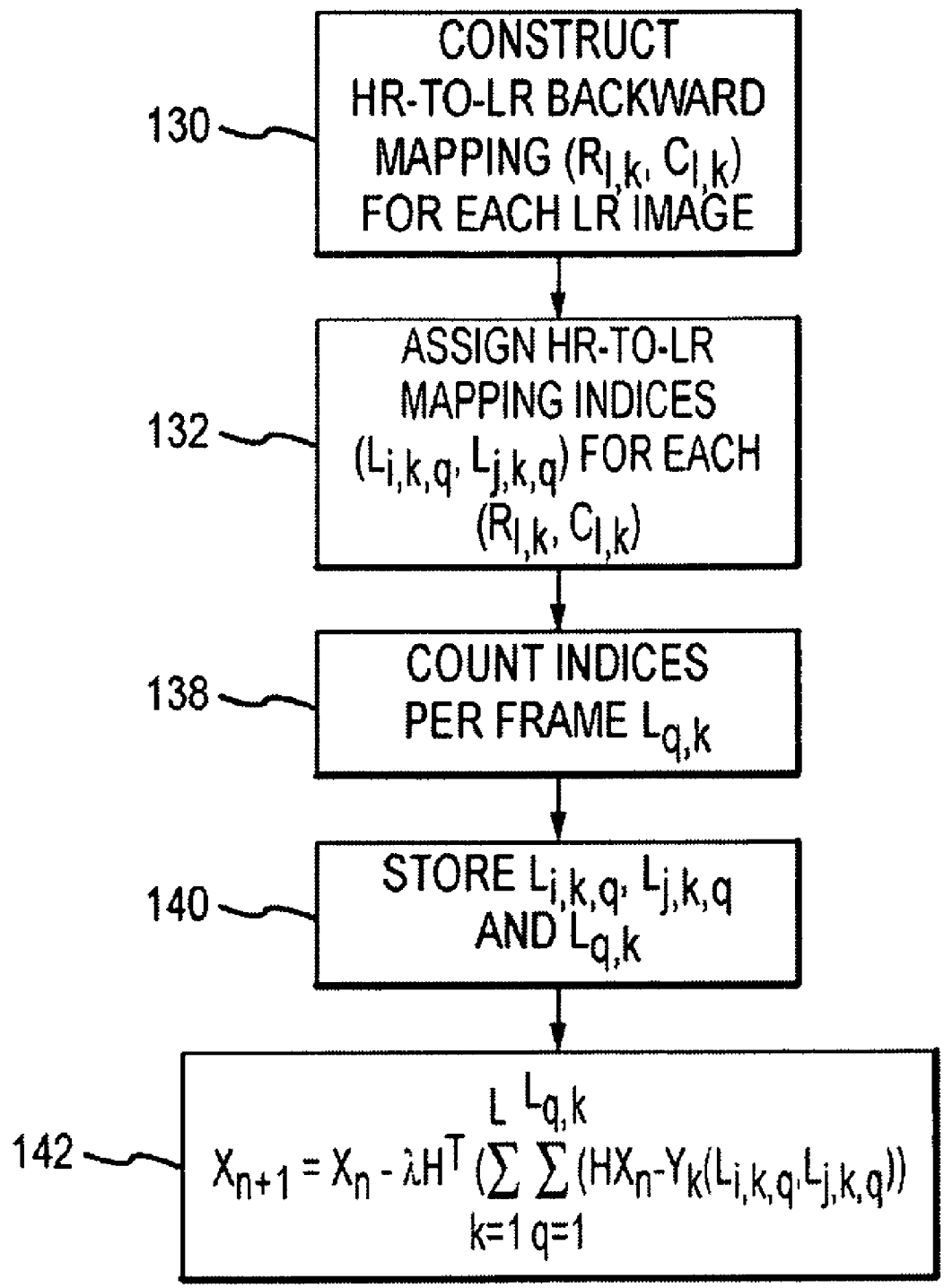
FIG. 8 is a flow diagram for constructing a modified MLE capable of implementing the super-resolution restoration technique for arbitrary real-valued r.

For real-valued r, which includes the subset of integers, the matrix form of the MLE does not exist. The robustness of the restoration based super resolution system is limited by the existing requirement to use only integer valued r. The system cannot in general select the max r for a given sequence of LR images to enhance the resolution of the HR image. The system cannot in general accommodate other applications such as range enhancement that set the desired r value at an arbitrary real value. Super resolution enhancement of a sequence of LR images 120 to form a HR image 122 having a real-valued r, 2.5 in this example, is shown in FIG. 7.

To accommodate real valued r the conventional MLE equation (5) must be modified. The HR image matrix X and de-blurring kernel H can accommodate arbitrary r values. However, the downsampling matrix $D_k$ cannot. Therefore $D_k$ and the matrix product $D_k^T F_k^T Y_k$ must be replaced.

$F_k^T Y_k$ is actually a warping operation with each LR frame. This means that the position of a point in the HR plane can be calculated from its LR index using a warping operation.

$$\begin{bmatrix} R_h \\ C_h \end{bmatrix} = F_k\left(\begin{bmatrix} R_l \\ C_l \end{bmatrix}\right) \qquad (6)$$

$F_k(\ )$ is a transformation. It depends on motion model of sensor and scene. When the distance between the scene and sensor is large and there are only three major types of motion, sensor rotation, zooming, and translation, equation (6) becomes $$\begin{bmatrix} R_h \\ C_h \\ 1 \end{bmatrix} = \begin{bmatrix} f_{11} & f_{12} & f_{13} \\ f_{21} & f_{22} & f_{23} \\ 0 & 0 & 1 \end{bmatrix} \begin{bmatrix} R_l \\ C_l \\ 1 \end{bmatrix}$$

or $$\begin{bmatrix} R_l \\ C_l \\ 1 \end{bmatrix} = \begin{bmatrix} g_{11} & g_{12} & g_{13} \\ g_{21} & g_{22} & g_{23} \\ 0 & 0 & 1 \end{bmatrix} \begin{bmatrix} R_h \\ C_h \\ 1 \end{bmatrix}$$

For translation ($u_k$, $v_k$), zooming ($z_k$) and rotation ($roll_k$) only $$\begin{bmatrix} R_{l,k} \\ C_{l,k} \\ 1 \end{bmatrix} = \begin{bmatrix} \frac{Cos(Roll_k)}{r \times z_k} & \frac{Sin(Roll_k)}{r \times z_k} & u_k \\ -\frac{Sin(Roll_k)}{r \times z_k} & \frac{Cos(Roll_k)}{r \times z_k} & v_k \\ 0 & 0 & 1 \end{bmatrix} \begin{bmatrix} R_h \\ C_h \\ 1 \end{bmatrix}$$

Given these geometric relationships, a method of constructing the modified MLE to handle real-valued r is illustrated in FIGS. 8, 9 and 10a-10b. r is an enhancement factor. $Roll_k$ is a measurement of sensor rotation. $u_k$ and $v_k$ are translation components of kth LR image.

Figure 9:
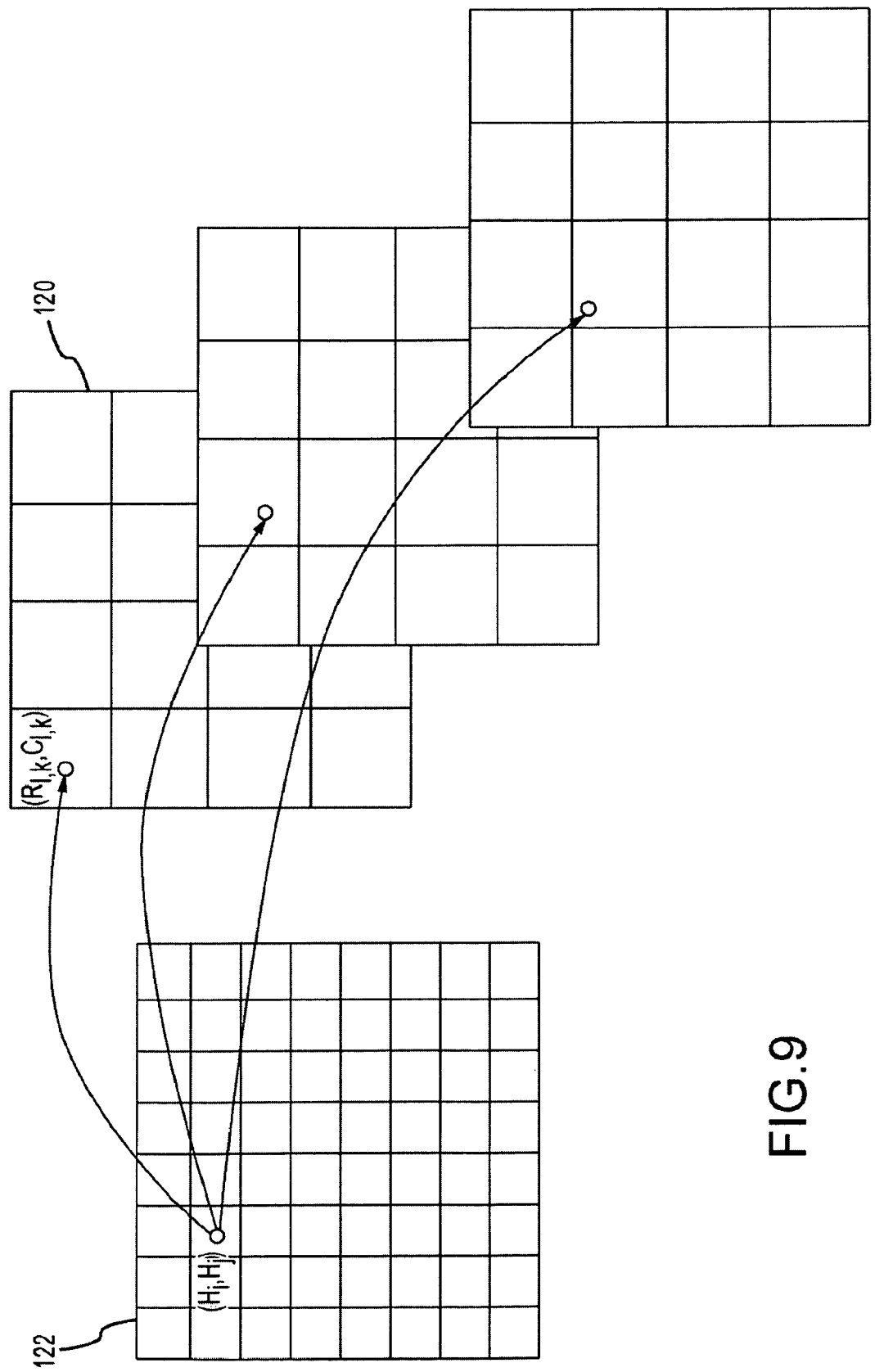
FIG. 9 is a diagram illustrating the HR-to-LR backward mapping ($R_{l,k}$, $C_{l,k}$) constructed for each LR image.

H*X is a blurred and digitized HR image. For each index ($H_i$, $H_j$) of H*X, its LR position is ($R_{l,k}$, $C_{l,k}$) on each LR plane. As shown in FIG. 9, the HR-to-LR backward mapping from HR image 122 to each LR image 120 is constructed (step 130) as:

$$\begin{bmatrix} R_{l,k} \\ C_{l,k} \\ 1 \end{bmatrix} = \begin{bmatrix} \frac{\cos(Roll_k)}{r \times z_k} & \frac{\sin(Roll_k)}{r \times z_k} & u_k \\ -\frac{\sin(Roll_k)}{r \times z_k} & \frac{\cos(Roll_k)}{r \times z_k} & v_k \\ 0 & 0 & 1 \end{bmatrix} \begin{bmatrix} H_i \\ H_j \\ 1 \end{bmatrix} \quad (7)$$

Since $R_{l,k}$ and $C_{l,k}$ may not be integers, $(R_{l,k}, C_{l,k})$ may not match any index of LR frame k. Therefore a group of LR indexes $(L_{i,k}, L_{j,k})$ can be selected for each HR pixel by the following criterion (step 132):

$$\sqrt{(L_{1,k}-R_{1,k})^2+(L_{j,k}-C_{1,k})^2} \leq c \; k=1, 2, 3, \ldots, L \quad (8)$$

Figure 10B:
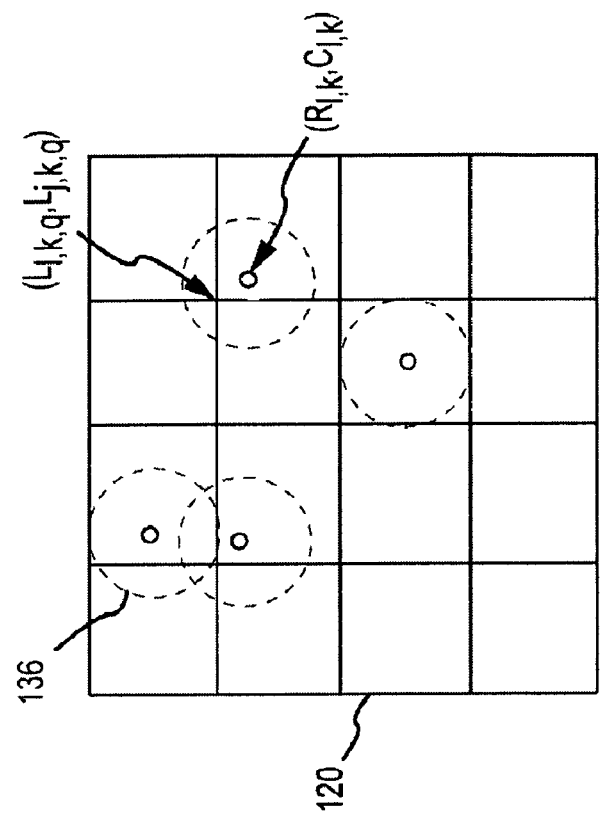
FIGS. 10a and 10b are diagrams illustrating the assignment of HR- to LR mapping indices ($L_{i,k,q}$, $L_{j,k,q}$) for each ($R_{l,k}$, $C_{l,k}$) in each LR image for different mapping radii c.
Figure 10A:
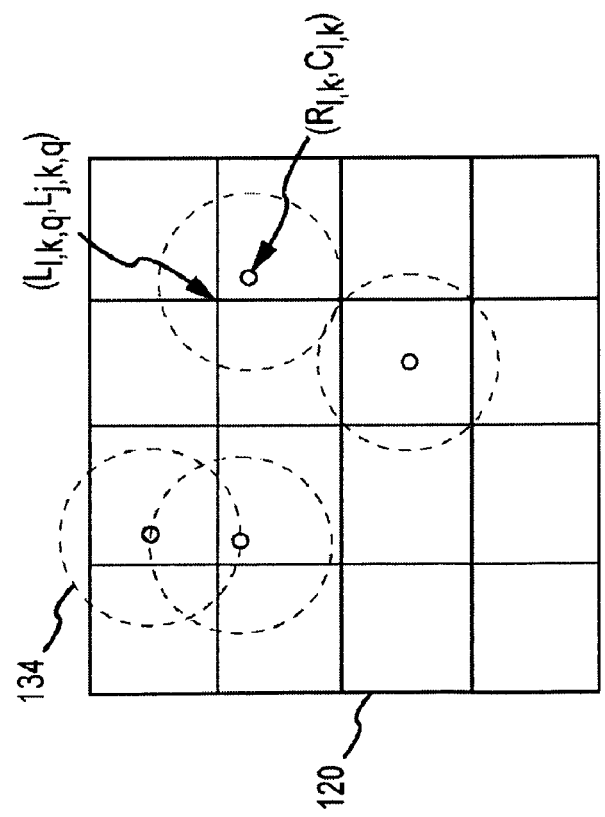

As shown in FIG. 10a, to ensure that each HR pixel is mapped to at least one LR index in at least one LR image, c>=SQRT(2)/2 134. The worst case would be if $(R_{l,k}, C_{l,k})$ for a specific HR pixel mapped to the center of an LR bin for each of the LR images, which is very unlikely but mathematically possible. The LR bin is of unit size so the distance from the center to each of the four corner indices is SQRT(2)/2. Therefore if c>=SQRT(2)/2 the HR pixel will map to at least one LR index in at least one of the LR images and the optimality condition set by max r holds. To avoid overlap and reduce the computational complexity a smaller c 136 e.g. ½ may be used as shown in FIG. 10b.

$L_{i,k}$ and $L_{j,k}$ may not always exist for each LR frame and there may be more than one for each LR frame. Therefore q is used to count the number of $(L_{i,k}, L_{j,k})$ for each HR pixel in each LR frame (step 138). $(L_{i,k}, L_{j,k})$ are functions of index of the HR image, LR frame number (k), as well as q. $L_{q,k}$ is the number of $(L_{i,k}, L_{j,k})$ for each LR frame. $L_{q,k}$ can be zero or more than one. $L_{i,k}$ and $L_{j,k}$ can be rewritten as $L_{i,k,q}$ and $L_{j,k,q}$ and stored (step 140).

$$L_{i,k,q}=f_r(H_i,H_{j,k,q})$$

$$L_{j,k,q}=f_c(H_i,H_{j,k,q}) \; k=1, 2, \ldots, L, \; q=1, 2, \ldots, L_{q,k}$$

$$L_{q,k}=f_q(H_i,H_j,k) \quad (9)$$

Thus the modified MLE for real-valued r is constructed (step 142) as $$X_{n+1} = X_n - \lambda H^T \left( \sum_{k=1}^{L} \sum_{q=1}^{L_{q,k}} (HX_n - Y_k(L_{i,k,q}, L_{j,k,q})) \right) \quad (10)$$

The computation can be improved by noticing that $L_{i,k,q}$ and $L_{j,k,q}$ won't change with iterations and they can be calculated in an initialization step. $H^T$ is a de-blurring operation and it can be replaced by T(PSF) function that flips the columns of PSF kernel in the left-right direction (that is, about the vertical axis), and then flips the row of PSF kernel in the up-down direction (that is, about the horizontal axis).

One approach to initializing the modified MLE is to finding the best $(L_{i,k,q}, L_{j,k,q})$ for each HR pixel e.g. the one closest LR index. Alternately, an average of all mapped indices could be used. The best index is found by $$\begin{bmatrix} L_{i,k,min} \\ L_{i,k,min} \end{bmatrix} = \min_{q \in L_{q,k}} \left( \sqrt{(L_{i,k,q} - R_{l,k})^2 + (L_{j,k,q} - C_{l,k})^2} \right)$$

$$k = 1, 2, \ldots, L$$

Meanwhile compute $$L_{i,k,q}=f_r(H_i,H_j,k,q)$$

$$L_{j,k,q}=f_c(H_i,H_j,k,q) \; H_i=1, 2, \ldots, int(r \cdot M),$$
$$H_j=1, 2, \ldots, int(r \cdot N), k=1, 2, \ldots, L$$

$$L_{q,k}=f_q(H_i,H_j,k) \quad (11)$$

Then construct X' using $Y_k(L_{i,k,min}, L_{j,k,min})$ $$X'=Y_k(L_{i,k,min}, L_{j,k,min})$$

Using the Wiener filter to de-blur the effects of PSF and detection, that is $$X_0=\text{wiener\_filter}(X').$$

$HRX_{n+1}$ can be iteratively computed using equations (10) and (11) until error of $X_{n+1}-X_n$ is small enough to satisfy a convergence criterion.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of image resolution enhancement, comprising:
    buffering a sequence of low-resolution (LR) images having M×N resolution;
    constructing the H and $H^T$ deconvolution kernels from a model of the imaging system that captured the LR images;
    measuring image motion for each LR image;
    using the measured image motion to calculate a maximum enhancement factor r that guarantees each bin in a high-resolution (HR) image having max r*M×max r*N resolution will have at least one corresponding LR intensity value;
    constructing a maximum likelihood estimator (MLE) that estimates an HR image from the sequence of LR images with an enhancement factor r less than or equal to max r without a regularization term based on deconvolution kernels H and $H^T$ and the measured image motion;
    initializing the ML estimator to provide an initial HR image; and
    iteratively applying the ML Estimator to the initial HR image and sequence of LR images to generate an HR image having rM×rN resolution.

2. The method of claim 1, wherein the deconvolution kernel H includes a camera point spread function Hcam and a detection function Hdet.

3. The method of claim 1, wherein the MLE estimates the HR image for real or integer valued r.

4. The method of claim 3, wherein the MLE performs the estimation according to:

$$X_{n+1} = X_n - \lambda H^T \left( \sum_{k=1}^{L} \sum_{q=1}^{L_{q,k}} (HX_n - Y_k(L_{i,k,q}, L_{j,k,q})) \right)$$

where $X_n$ is the (rM,rN) HR image, Y is the (M,N) LR image, $(L_{i,k,q}, L_{j,k,q})$ are HR-to-LR mapping indices and $L_{q,k}$ is the count of mapping indices for each HR pixel in each LR image.

5. The method of claim 1, wherein enhancement factor r is an integer, said MLE performs the estimation according to:

$$X_{n+1} = X_n - \lambda H^T \left( \sum_{k=1}^{L} (HX_n - D_k^T F_k^T Y_k) \right)$$

where Y is the (M,N) LR image, $X_n$ is the (rM,rN) HR image, H is the de-convolution kernel, D is the down sampling matrix and F is the motion effect.

6. The method of claim 1, wherein the maximum r is determined by incrementing r from an initial value until the maximum entropy for r is greater than the actual entropy of the sequence of LR images and then decrementing r.

7. The method of claim 6, wherein r is incremented by a fractional step-size less than one.

8. The method of claim 7, wherein maximum r is determined by:
  a) setting r to an initial value;
  b) incrementing r by the fractional step-size less than one;
  c) initializing an occurrence matrix P(i,j) to 0 for i,j=0, 1, ... floor(r);
  d) mapping each LR image k to a pair of indices Hr(k), Hc(k) in the occurrence matrix P(i,j) based on the measured image motion and r;
  f) assigning P(Hr(k),Hc(k))=constant for each LR image k;
  g) counting n=sum(P(i,j))/constant for i=0, 1 ... floor(r); and
  h) if log(n) is not less than 2 log(r), repeating steps (b) through (h) else decrementing r by the fractional step-size and stop.

9. The method of claim 8, wherein the sequence of LR images are rotated and scaled to a baseline image, each LR image k mapped to indices Hr(k)=floor(mod($u_k$,r)) and Hc(k)=floor(mod($v_k$,r)) where $u_k$ and $v_k$ are the translation of the $k^{th}$ LR image.

10. The method of claim 1, wherein a fixed number L of LR images are buffered, the maximum enhancement factor r for those L LR images is calculated and r is selected less than or equal to max r.

11. The method of claim 10, wherein r is set to max r.

12. The method of claim 1, wherein r is selected a priori and a variable number of LR images are buffered until the maximum r for the buffered LR images is at least equal to the selected r.

13. The method of claim 12, wherein r is selected for each frame by,
  specifying a desired range to an object in the LR image;
  measuring the range to the object; and
  setting r equal to the measured range divided by the desired range.

14. A system for image resolution enhancement, comprising:
  a camera for capturing low-resolution (LR) video images having M×N resolution;
  a buffer for buffering a sequence of the LR video images;
  a memory; and
  a processor that (a) measures image motion for each LR image, (b) calculates a maximum enhancement factor r that guarantees each bin in a high-resolution (HR) image having max r*M×max r*N resolution will have at least one corresponding LR intensity value, (c) constructs HR-to-LR backward mapping ($R_{l,k}$, $C_{l,k}$) for each LR image for a selected real-valued r less than or equal to max r, assigns HR- to LR mapping indices ($L_{i,k,q}$, $L_{j,k,q}$) for each ($R_{l,k}$, $C_{l,k}$) in each LR image and counts the indices for each HR pixel per LR image $L_{q,k}$, (d) stores $L_{i,k,q}$, $L_{j,k,q}$ and $L_{q,k}$ in said memory, (e) constructs a maximum likelihood estimator $$MLEX_{n+1} = X_n - \lambda H^T \left( \sum_{k=1}^{L} \sum_{q=1}^{L_{q,k}} (HX_n - Y_k(L_{i,k,q}, L_{j,k,q})) \right), (f)$$

initializes the MLE to provide an initial HR image, and (g) iteratively applies the MLE to the initial HR image and sequence of LR images to generate an HR image having rM×rN resolution.

15. A method of selecting an enhancement factor r for a maximum likelihood estimator (MLE) for image resolution enhancement without regularization, comprising:
  buffering a sequence of low-resolution (LR) video images having resolution of M×N;
  incrementing r from an initial value until the maximum entropy for r is greater than the actual entropy of the sequence of LR images; and
  decrementing r to provide the maximum value that guarantees each bin in a high-resolution (HR) image having max r*M×max r*N resolution will have at least one corresponding LR intensity value.

16. The method of claim 15, wherein r is incremented by a fractional step-size less than one.

17. The method of claim 16, wherein maximum r is determined by:
  a) setting r to an initial value;
  b) incrementing r by the fractional step-size less than one;
  c) initializing an occurrence matrix P(i,j) to 0 for i,j=0, 1, ... floor(r);
  d) mapping each LR image k to a pair of indices Hr(k), Hc(k) in the occurrence matrix P(i,j) based on the measured image motion and r;
  f) assigning P(Hr(k),Hc(k))=constant for each LR image k;
  g) counting n=sum(P(i,j))/constant for i=0, 1 ... floor(r); and
  h) if log(n) is not less than 2log(r), repeating steps (b) through (h) else decrementing r by the fractional step-size and stop.

18. The method of claim 17, wherein the sequence of LR images are rotated and scaled to a baseline image, each LR image k mapped to indices Hr(k)=floor(mod($u_k$,r)) and Hc(k)=floor(mod($v_k$,r)) where $u_k$ and $v_k$ are the translation of the $k^{th}$ LR image.

19. A method of maximum likelihood (ML) estimation of a high-resolution (HR) image X from a sequence of low-resolution (LR) images Y with a positive real-valued enhancement factor r, comprising:
  constructing H and $H^T$ deconvolution kernels from a model of the imaging system used to capture the LR images;
  measuring image motion for each LR image;
  from a selected r and measured image motion, constructing HR-to-LR backward mapping ($R_{l,k}$, $C_{l,k}$) for each LR image, assigning HR- to LR mapping indices ($L_{i,k,q}$, $L_{j,k,q}$) for each ($R_{l,k}$, $C_{l,k}$) in each LR image and counting the indices for each HR pixel per LR image $L_{q,k}$;
  storing $L_{i,k,q}$, $L_{j,k,q}$ and $L_{q,k}$;
  constructing a maximum likelihood (ML) estimator $$X_{n+1} = X_n - \lambda H^T \left( \sum_{k=1}^{L} \sum_{q=1}^{L_{q,k}} (HX_n - Y_k(L_{i,k,q}, L_{j,k,q})) \right);$$

initializing the ML estimator to provide an initial HR image $X_0$; and
  iteratively applying the ML Estimator to the initial HR image $X_0$ and sequence of LR images $Y_k$ to generate an HR image $X_{n+1}$ having resolution increased by r until the error satisfies a convergence condition.

20. The method of claim 19, wherein the HR-to-LR backward mapping ($R_{l,k}$, $C_{l,k}$) is constructed fore each LR image k according to:

$$\begin{bmatrix} R_{l,k} \\ C_{l,k} \\ 1 \end{bmatrix} = \begin{bmatrix} \frac{Cos(Roll_k)}{r \times z_k} & \frac{Sin(Roll_k)}{r \times z_k} & u_k \\ -\frac{Sin(Roll_k)}{r \times z_k} & \frac{Cos(Roll_k)}{r \times z_k} & v_k \\ 0 & 0 & 1 \end{bmatrix} \begin{bmatrix} H_i \\ H_j \\ 1 \end{bmatrix}$$

where $roll_k$ is sensor rotation, $z_k$ is system zoom and $u_k$, $v_k$ are translation components of the $k^{th}$ LR image.

21. The method of claim 19, wherein the HR- to LR mapping indices ($L_{l,k,q}$, $L_{j,k,q}$) are assigned for each ($R_{l,k}$, $C_{l,k}$) in each LR image according to:

$$\sqrt{(L_{1,k,q}-R_{1,k})^2+(L_{j,k,q}-C_{1,k})^2} \leq c.$$

22. The method of claim 21, wherein c is at least square-root of two divided by two.

* * * * *